United States Patent
Kotamraju (10) Patent No.: US 10,367,808 B1
(45) Date of Patent: *Jul. 30, 2019

(54) CONTEXTUAL AND TIME SENSITIVE OUT OF BAND TRANSACTIONAL SIGNING

(71) Applicant: Wells Fargo Bank, N.A., San Francisco, CA (US)

(72) Inventor: Sridhar Kotamraju, Fremont, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/887,292

(22) Filed: Feb. 2, 2018

Related U.S. Application Data (63) Continuation of application No. 14/698,377, filed on Apr. 28, 2015, now Pat. No. 9,906,519.

(51) Int. Cl.
*H04L 9/32* (2006.01)
*H04L 29/06* (2006.01)

(52) U.S. Cl.
CPC .......... *H04L 63/083* (2013.01); *H04L 9/3271* (2013.01)

(58) Field of Classification Search
CPC ...... G06F 21/31; H04L 63/083; H04L 9/3271
USPC ............................................................ 726/6
See application file for complete search history.

(56) References Cited

U.S. PATENT DOCUMENTS

| 9,906,519 | B1* | 2/2018 | Kotamraju | H04L 63/083 |
| 2009/0217368 | A1* | 8/2009 | Buss | G06F 21/34 726/9 |
| 2013/0219479 | A1* | 8/2013 | DeSoto | H04W 12/06 726/6 |
| 2015/0200922 | A1* | 7/2015 | Eschbach | H04L 63/08 358/1.14 |
| 2015/0254656 | A1* | 9/2015 | Bondesen | G06Q 20/227 705/41 |

\* cited by examiner

*Primary Examiner* — Kambiz Zand
*Assistant Examiner* — Aubrey H Wyszynski
(74) *Attorney, Agent, or Firm* — Walter Haverfield LLP; James J. Pingor (57) ABSTRACT

Provided is contextual and time sensitive out of band transactional signing. The transactional signing includes providing a token code in response to a request to initiate a transaction within a secure network. The request is received over a first channel and the token code is provided over a second channel. The first channel and the second channel are different channels. The transactional signing also includes evaluating a received context, wherein the context is appended to the token code. In addition, the transactional signing includes selectively allowing the transaction based on the context appended to the token code.

20 Claims, 8 Drawing Sheets

CONTEXTUAL AND TIME SENSITIVE OUT OF BAND TRANSACTIONAL SIGNING

CROSS-REFERENCE TO RELATED APPLICATIONS

This application claims priority to the pending U.S. patent application Ser. No. 14/698,377 entitled CONTEXTUAL AND TIME SENSITIVE OUT OF BAND TRANSACTIONAL SIGNING and filed on Apr. 28, 2015. The entirety of the above-noted application is incorporated by reference herein.

BACKGROUND

Authentication is the process of determining whether a person is the actual person they are asserting themselves to be. A common type of authentication is based on logon passwords or other credentials. As it relates to financial institutions, for example, a customer may access and transact with one or more of the customer's financial institution(s) accounts through a variety of channels. As non-limiting examples, a customer's physical credit card may be used to make purchases at a point of sale and/or a credit card number may be used to make purchases online. In other examples, the customer's account information may be accessed and viewed through a financial institution website, the customer may manage an account through a telephone interaction, and so on. Although these options provide increased access and convenience for the customer, each of these channels also provide opportunities for fraudulent access. On the user side, an occurrence of fraud (e.g., compromised financial data, monetary loss, identity theft, and so on) as well as the need to provide authentication information (e.g., enter a temporary pass code or one time password) have been blamed for user dissatisfaction. On the network side, malware that operates to intercept the temporary pass code or one time password makes it increasingly difficult to authenticate devices and users associated with the devices with a high degree of confidence.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

An aspect relates to a system that includes a processor that executes computer executable components stored in a memory. The computer executable components may include a security manager component that transmits a token code and a security question in response to an indication of a transaction attempt within a secure site. The indication is received over a first communications channel and the token code and the security question are transmitted over a second communications channel different from the first communications channel. The system also includes an authorization manager component that analyzes a reply to the security question and selectively allows the transaction based on the analysis. The reply is appended to a received token code.

Another aspect relates to a method that may include providing, by a system comprising a processor, a token code in response to a request to initiate a transaction within a secure network. The request is received over a first channel and the token code is provided over a second channel. The first channel and the second channel are different channels. The method may also include evaluating, by the system, a received context, wherein the context is appended to the token code. Further, the method may include selectively allowing, by the system, the transaction based on the context appended to the token code.

Yet another aspect relates to a computer-readable storage device storing executable instructions that, in response to execution, cause a system comprising a processor to perform operations. The operations may include receiving, over a first communications channel, an indication of a transaction attempt within a secure site and transmitting, over a second communications channel different from the first communications channel, a token code and a security question. The operations may also include receiving a reply to the security question and selectively allowing the transaction based on analysis of the reply. The reply is appended to the token code. To the accomplishment of the foregoing and related ends, certain illustrative aspects of the innovation are described herein in connection with the following description and the annexed drawings. These aspects are indicative, however, of but a few of the various ways in which the principles of the innovation may be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Various non-limiting embodiments are further described with reference to the accompanying drawings in which.

DETAILED DESCRIPTION

The innovation is now described with reference to the drawings. In the following description, for purposes of explanation, numerous specific details are set forth in order to provide a thorough understanding of the subject innovation. It may be evident, however, that the innovation may be practiced without these specific details. In other instances, well-known structures and devices are shown in block diagram form in order to facilitate describing the innovation.

Figure 1:
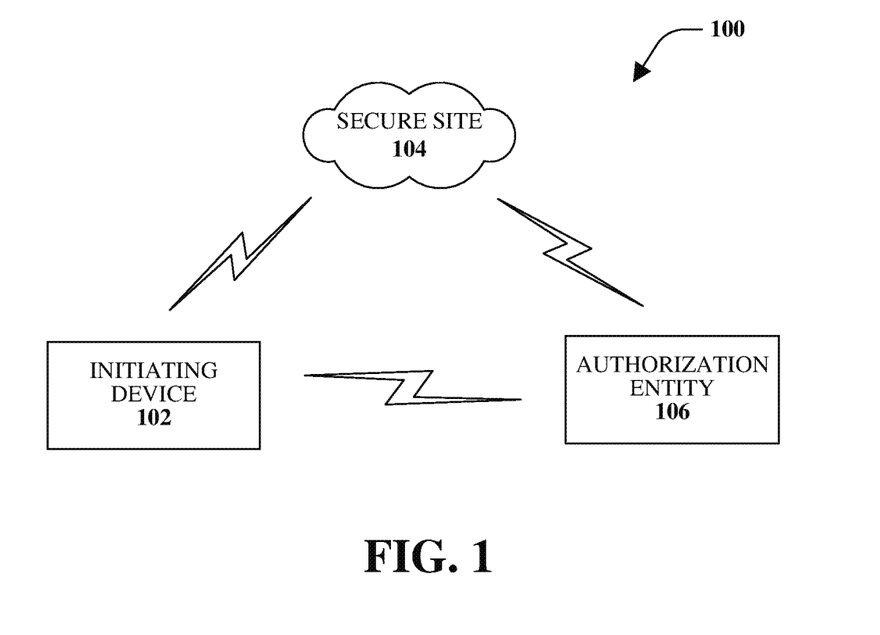
FIG. 1 illustrates an example, non-limiting representation of a communications environment in which the disclosed aspects may be utilized.

FIG. 1 illustrates an example, non-limiting representation of a communications environment 100 in which the disclosed aspects may be utilized. The communications environment 100 includes an initiating device 102 that is attempting to perform one or more transactions within a secure site 104. The initiating device 102 may be a communication device (e.g., desktop computer, laptop computer, smart phone, and so on). The secure site 104 may be a network associated with an entity, for example. As used herein an "entity" refers to a financial institution, such as a bank, persons operating on behalf of the financial institution, and/or communication devices managed by the financial institution and/or the persons operating on behalf of the financial institution. Additionally or alternatively, the entity may be a third party monitoring source, security provider, or another type of entity that has a trusted relationship with the financial institution.

Also illustrated in the environment 100 is an authorization entity 106. Although illustrated as separate from the secure site 104, according to some implementations, the authorization entity 106 may be communicatively coupled to the secure site 104. For example, the authorization entity 106 may be a trusted third party that performs authorization functions on behalf of the secure site 104 (e.g., an entity associated with the secure network). In another example, the secure site 104 may be configured to perform the authorization functions (e.g., the authorization entity 106 is included in the secure site 104).

According to various aspects disclosed herein, contextual and time sensitive out of band transactional signing is provided. The transactional signing as discussed herein may be applied when a user (e.g., through the initiating device 102) attempts to log in to access a website or other secure site 104, such as a financial institution website, from an unrecognized device or location. The transactional signing may also be applied when a user (or the initiating device 102) is attempting to log in through an unrecognized or suspicious Internet Protocol (IP) address, such as, for example, when the user is making an out of band log in attempt. In another example, the transaction signing may be applied based on user preferences, preferences of the secure site, or other considerations.

In some traditional systems, the user may be required to enter a one-time passcode (OTP) or other authentication code generated by a recognized/strongly bound device in order to proceed to log in through an unrecognized channel (e.g., unrecognized device). However, such traditional systems may be compromised with malware (resident on the user device) that operates to intercept the OTP or code. The various aspects disclosed herein are configured to mitigate the chances of a rogue entity intercepting the code or otherwise gaining access to, or performing transactions within, the secure site 104. Therefore, the occurrence of fraud and other undesirable activities may be mitigated.

According to an implementation, an additional factor (or more than one additional factor) may be added to an input received from the initiating device 102. Additional factors may include, but are not limited to, the context of the transaction being made through the initiating device. For example, the context may be a current location of the user (e.g., initiating device), a behavior pattern of the user, a consideration of whether the user is performing a normal activity for the user or an activity that is abnormal for the user, and so on. In other examples, the context may be a monetary value of the transaction, a name of a recipient of a monetary transaction, and so forth. According to some aspects, the user may be provided a choice or a range of options from which to choose. Based on the selection, the context from the transaction may be appended to the token code, which may be performed dynamically by the initiating device 102.

By combining the contexts or factors with the token code, the authorization entity 106 may selectively allow the initiating device 102 to proceed with the attempted transaction with the secure site 104. According to the aspects discussed herein, the user is not required to input the code on a desktop environment, for example. Thus, if the token code is "12345," the user is not responding back with "12345." Instead, one or more contexts (or one or more factors) are appended to the token code "12345" (according to this example) and the combination is conveyed from the initiating device 102 to the authorization entity 106. In the case of a rogue entity, the rogue entity may not be able to supply the correct contexts or factors and, thus, the transaction may be denied.

Further, there may be at least one temporal aspect associated with the token code. For example, at about the same time as the code and security question(s) (or a range of questions) are transmitted, a timer may be initiated. The value of the timer may be predetermined based on various considerations such as the amount of time needed to convey the information, an amount of time for the information to be entered by the user (or automatically applied by the initiating device 104), the amount of time needed to transmit the reply, and so on. According to some aspects, the value of the timer may be configurable such that traffic delays, network delays, and other considerations may be factored into the timer value. If a reply is received prior to the expiration of the timer, the reply may be considered, as discussed herein. However, if the timer expires, then too much time has elapsed and the transaction is automatically denied. In this situation, a subsequent transaction will be initiated.

According to an implementation, a user logs into an online banking website (e.g., in a desktop environment). The user initiates a non-monetary event. For example, the user may be updating his profile information (e.g., address, phone number, and so on), changing features or options, and so forth. The system 100 may make a determination based on these events, such as determining that the transaction attempt is an out of band authentication, and a code is conveyed to the user. The user device (e.g., the initiating device 102) receives the code and appends a context identifier that is relevant to the transaction to the code. For example, if the transaction is an email address update, the user (through the user device) may receive one or more options to select and the user device can append the context to the token code based on the user's selection. The user responds to the server (e.g., the system 100) through a trusted device (in this example, the trusted device is a banking application executing on a mobile device or the initiating device 102). The server may automatically respond to an identification of the context plus the details provided by the user. Based on confirmation, the user may be allowed to continue the transaction on the mobile device, which may be presented to the user based on a screen refresh that indicates the transaction is allowed. There is no point in this process where the user takes the code and puts the code in their desktop environment.

In accordance with another implementation, a user logs into the secure site 104, which may be an online banking website (e.g., in a desktop environment). The user initiates a monetary event. The system 100 makes a determination that an out of band authentication is necessary. In the context of monetary events, the user device, or the initiating device 102 appends the transaction details to a token code, which may be performed automatically, without user interaction. The transaction details may be the type of transaction (e.g., wire transaction, transfer of funds, and so), the destination, the amount, details of a beneficiary, or other information. The system 100, upon receipt of this information may selectively allow the transaction. No additional input is necessary from the user on a desktop environment. Thus, the user receives the challenge and uses the same mobile channel to respond and the system makes a determination whether the response is valid or is not valid. Further, the system or user device automatically triggers a refresh on the screen or performs another type of graphical user interface change, which allows the user to continue.

According to another implementation, the system 100 may detect a high-value monetary transaction request. To make a determination as to whether the transaction request is real or is a fraudulent request, the system may send a mandate to the user. The mandate may be for the user to provide information related to a merchant type (e.g., brick and mortar store, website, or another type), details of the merchant (e.g., name, phone number, physical address, website address, and so on), the transaction value, or other identifying information. The details may be provided in a financial application executing on the user device, which may be at the same location as the transaction location (e.g., at a store) or at a different location (e.g., over the Internet).

The application executing on the user device may be reviewed in real-time and a determination whether to approve or not approve the transactions is performed. The determination may be made based on a subset of the details provided. For example, the mandate may be for the user to provide five different types of details and, at substantially the same time as the details for the five types are received, a subset (e.g., two types, three types) are chosen for analysis. The subset may be chosen as the types that are considered more critical for the current transaction (and might not be the same types used for another transaction). At substantially the same time as the details related to at least the subset are analyzed, a determination may be made related to whether the code received with the details is the correct code.

According to some implementations, a challenge is not presented to the user. Instead, the user's pattern is determined based on historical information associated with the user. Such historical information may include a location of the user and/or transaction, a transaction pattern, a transaction type, a transaction amount, and other data. If a current transaction matches known transactions from the historical information (e.g., is within an expected range and/or an acceptable range), the current transaction may be automatically allowed.

Further, when the financial application is executing on the user device, the two-way communication process may be automatically implemented. In accordance with some aspects, the system may obtain data directly from the user device without needing manual input from the user. At other times, however, input from the user might still be needed and the user may be provided a variety of options as to the information provided in real-time.

According to another implementation, a two-way communication may be established through a downloadable application executing on the user device. The downloadable application may be configured to extract details related to the user device automatically. For example, the user may authorize the application to automatically extract details x, y, and z from his device. The details that may be extracted may be preset application permission values. Thus, without the user needing to open the application, a two-way communication is established and information related to a location and/or activities of a user are automatically provided to the authentication manager component. In accordance with one or more implementations described in this disclosure, users can opt-out of providing personal information, demographic information, location information, proprietary information, sensitive information, or the like in connection with data gathering aspects.

In an example, the financial institution or other entity may make a determination that the details of the user and behavior pattern are known based on automatic payments sitting on the user device. Further, the determination may be made based on the user having provided permission for the financial institution or other entity to interact with the values on the user device, wherein the values are extracted to make the determination. If the values match, the transaction is allowed. If there is a mismatch in any of the information, then an OTP process can be implemented and a context is provided, as discussed herein.

Figure 2:
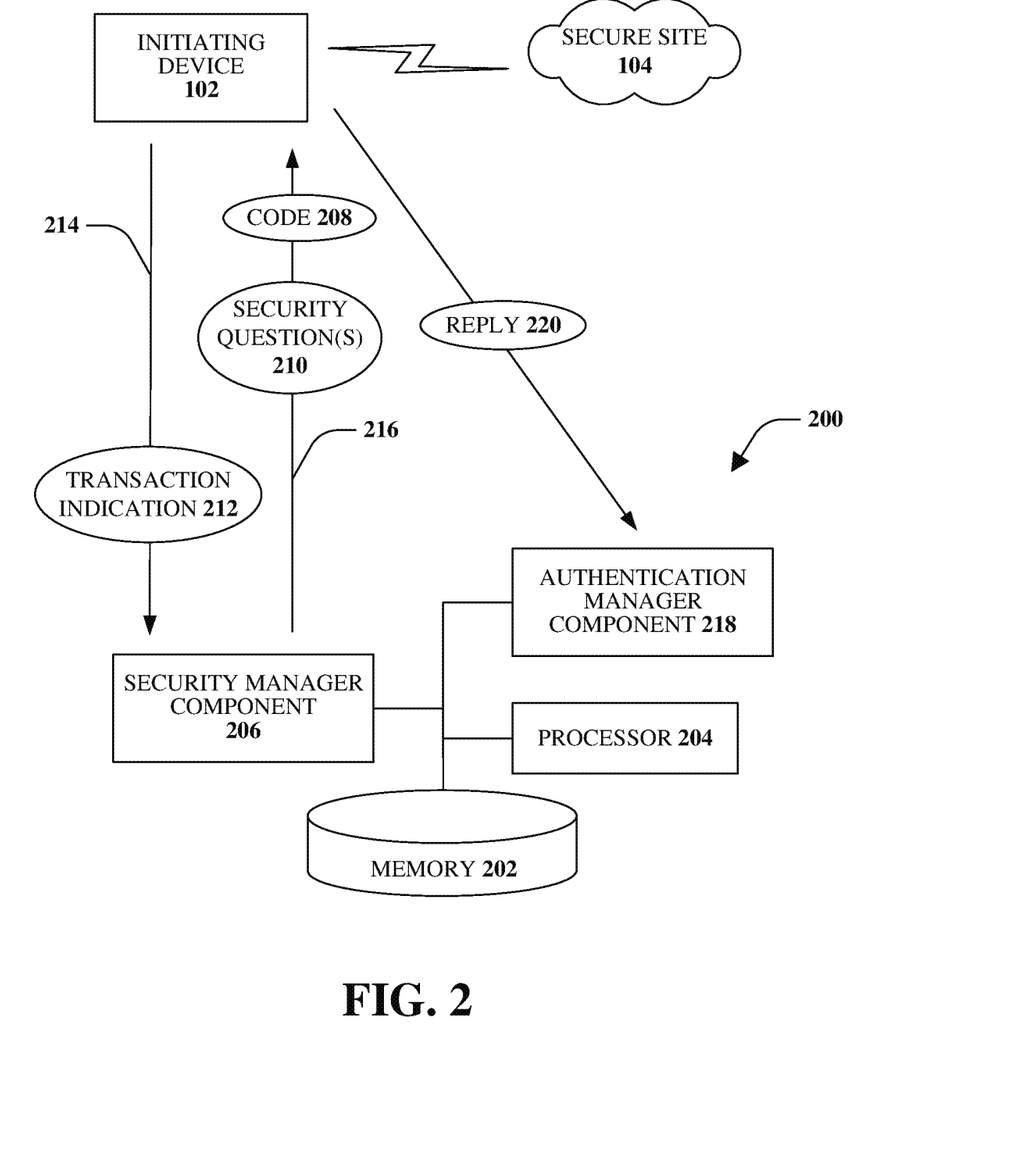
FIG. 2 illustrates an example, non-liming implementation of a system configured for out of band authentication, according to an aspect.

FIG. 2 illustrates an example, non-liming implementation of a system 200 configured for out of band authentication, according to an aspect. As discussed above, traditional out of band verification processes may request a user to input a code that is distributed on the user's mobile device and for verification purposes, wherein the code needs to be input on a device other than the mobile device. A challenge associated with these traditional approaches is that a typical form of malware may easily defeat the verification process.

To overcome the above-described challenges as well as other challenges associated with conventional approaches, various aspects disclosed herein relate to removing the complexity from a user's input into a client application and in response to receipt of a token code. Elimination of the need for user input on the client application side may mitigate malware interception of the code.

The system 200 may include at least one memory 202 that may store computer executable components and/or computer executable instructions. The system 200 may also include at least one processor 204, communicatively coupled to the at least one memory 202. The at least one processor 204 may facilitate execution of the computer executable components and/or the computer executable instructions stored in the memory 202. The term "coupled" or variants thereof may include various communications including, but not limited to, direct communications, indirect communications, wired communications, and/or wireless communications.

It is noted that although the one or more computer executable components and/or computer executable instructions may be illustrated and described herein as components and/or instructions separate from the memory 202 (e.g., operatively connected to the memory 202), the various aspects are not limited to this implementation. Instead, in accordance with various implementations, the one or more computer executable components and/or the one or more computer executable instructions may be stored in (or integrated within) the memory 202. Further, while various components and/or instructions have been illustrated as separate components and/or as separate instructions, in some implementations, multiple components and/or multiple instructions may be implemented as a single component or as a single instruction. Further, a single component and/or a single instruction may be implemented as multiple components and/or as multiple instructions without departing from the example embodiments.

The system 200 may also include a security manager component 206 that may be configured to transmit a token code 208 and a security question 210 (or a set of security questions) in response to an indication 212 of an attempt to perform a transaction within a secure site 104. The indication 212 may be received from an initiating device 102, as illustrated. Alternatively, the indication may be received from the secure site 104.

The transaction may be a non-monetary transaction (e.g., user profile, preferences, accessing forms, and so on) or a monetary transaction (e.g., viewing account balances or transactions, transferring money, wiring money, making a payment, depositing funds, and other financial transactions).

The communication between the system 200 and the initiating device 104 may be an out of band communication (e.g., a communication on a different channel, or by a different method, than the channel or method of the primary communication channel). As used herein, the out of band communication will be referred to as different communication channels. Therefore, the indication 212 may be received over a first communications channel 214 and the code 208 and the security question(s) 210 may be transmitted over a second communications channel 216. The first communication channel 214 and the second communications channel 216 may be different channels. For example, the initiating device 202 may be a desktop computer, wherein a user has logged into the secure site 104. Therefore, the indication 212 of the transaction is received from the desktop computer. In response, the code 208 and the security question(s) 210 may be transmitted through a Short Message Service (SMS), for example.

An authorization manager component 218 may be configured to analyze a reply 220 received in response to the security question(s) 210. The reply 220 may be appended to the code 208. For example, if the reply 220 is the expected reply (and includes the code 208), the authorization manager component 218 allows the transaction to continue. However, if the reply 220 is not the expected reply (and/or the received code is not the code 208), the transaction request is denied and/or more information is solicited from the initiating device 102.

Figure 3:
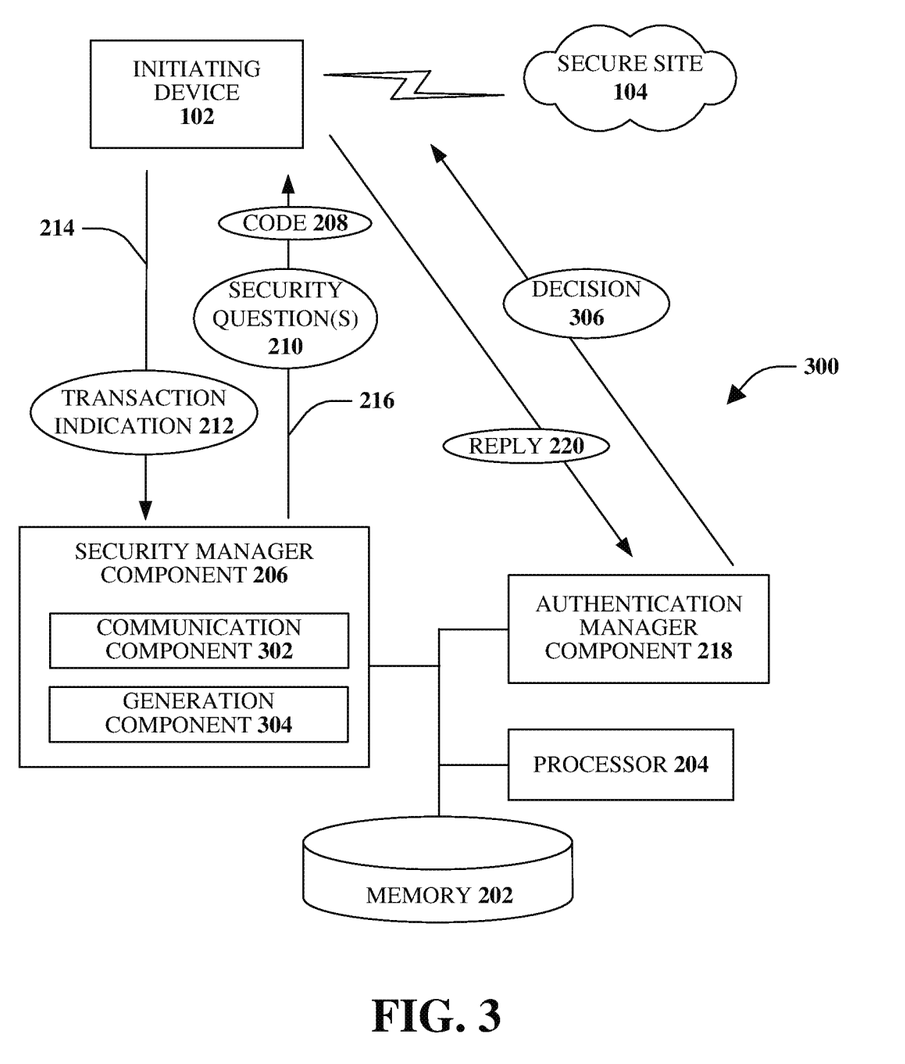
FIG. 3 illustrates another example, non-limiting system configured to provide contextual and time sensitive out of band multi-channel transactional signing, according to an aspect.

FIG. 3 illustrates another example, non-limiting system 300 configured to provide contextual and time sensitive out of band multi-channel transactional signing, according to an aspect. An initiating device 102 may log into a secure site 104. For example, the initiating device 102 may be authorized to access the secure site 104 based on an initial authorization. This initial authorization may include the entry of a user name and password pair or other manners of signing into a website or providing credentials. However, because the correct credentials were provided and limited access to the secure site is allowed, an entity performing a subsequent transaction within the secure site might be someone other than the authorized user (e.g., man in the middle attack). A man in the middle attack occurs when a rogue entity (e.g., attacker) relays and/or alters a communication between two parties (e.g., a user associated with the initiating device 102 and the secure site 104). However, the two parties mistakenly believe they are communicating with each other.

To overcome man-in-the middle and other unauthorized access and/or transactions with the secure site 104, a communication component 302 may be configured to receive a transaction indication 212. For example, after logging into the secure site 104, the initiating device 102 (or user thereof) may attempt to perform a transaction, which may be a monetary transaction or a non-monetary transaction. The transaction indication 212 may be received from the initiating device 102, the secure site 104, or an associated device. Further, the communication component 302 may be configured to determine a communication channel 214 over which the transaction indication 212 is received.

Based on the transaction indication 212, a generation component 304 may be configured to produce a code 208 (e.g., token code). In addition to generating the code 208, the generation component 304 may be configured to generate one or more security questions 210 in response to the transaction indication 212. In some implementations, the one or more security questions 210 may include a range of questions, wherein one or more of the questions within the range may be selected and answered at the initiating device 102. The one or more security questions 210 may relate to the transaction being attempted, information related to the user (that only the user would know), and so on.

Further, the security manager component 206 (or the communication component 302) may be configured to transmit the code 208 and the security question(s) 210 at substantially the same time in response to the transaction indication 212. The transmission by the security manager component 206 (or communication component 302) may be over a second communication channel 216, different from the communication channel 214. Thus, the communication channel 216 used to convey the code 208 and the security question(s) 210 is not associated with the communication channel 214 that was used to convey the initial request (e.g., the transaction indication 212).

The authentication manager component 218 may be configured to evaluate a reply 220 received from the initiating device 102. The reply 220 may include one or more answers to the security question(s) 210. The one or more answers may be appended to the code 208. Thus, the initiating device 102 may be configured to combine the code 208 and the answers to the security question(s) 210.

At about the same time as the reply 220 is received, the authentication manager component 218 may be configured to determine whether the transaction should be allowed, should be denied, or whether additional information should be retrieved from the initiating device 104. For example, if the response(s) to the question(s) are the expected response(s), the authentication manager component 218 may allow the transaction. However, if the response(s) are not as expected, the authentication manager component 218 may deny the transaction. Alternatively, if the response(s) are not the expected responses, additional information may be solicited from the initiating device 102 (e.g., through interaction with the security manager component 206 or another system 300 component).

The authentication manager component 218 may be configured to convey the decision 306 to the initiating device 102 in a format that is automatically applied at the initiating device 102. For example, the decision 306 may be applied as a refresh on a screen of the initiating device 102 or as another type of graphical user interface (GUI) change or update.

Figure 4:
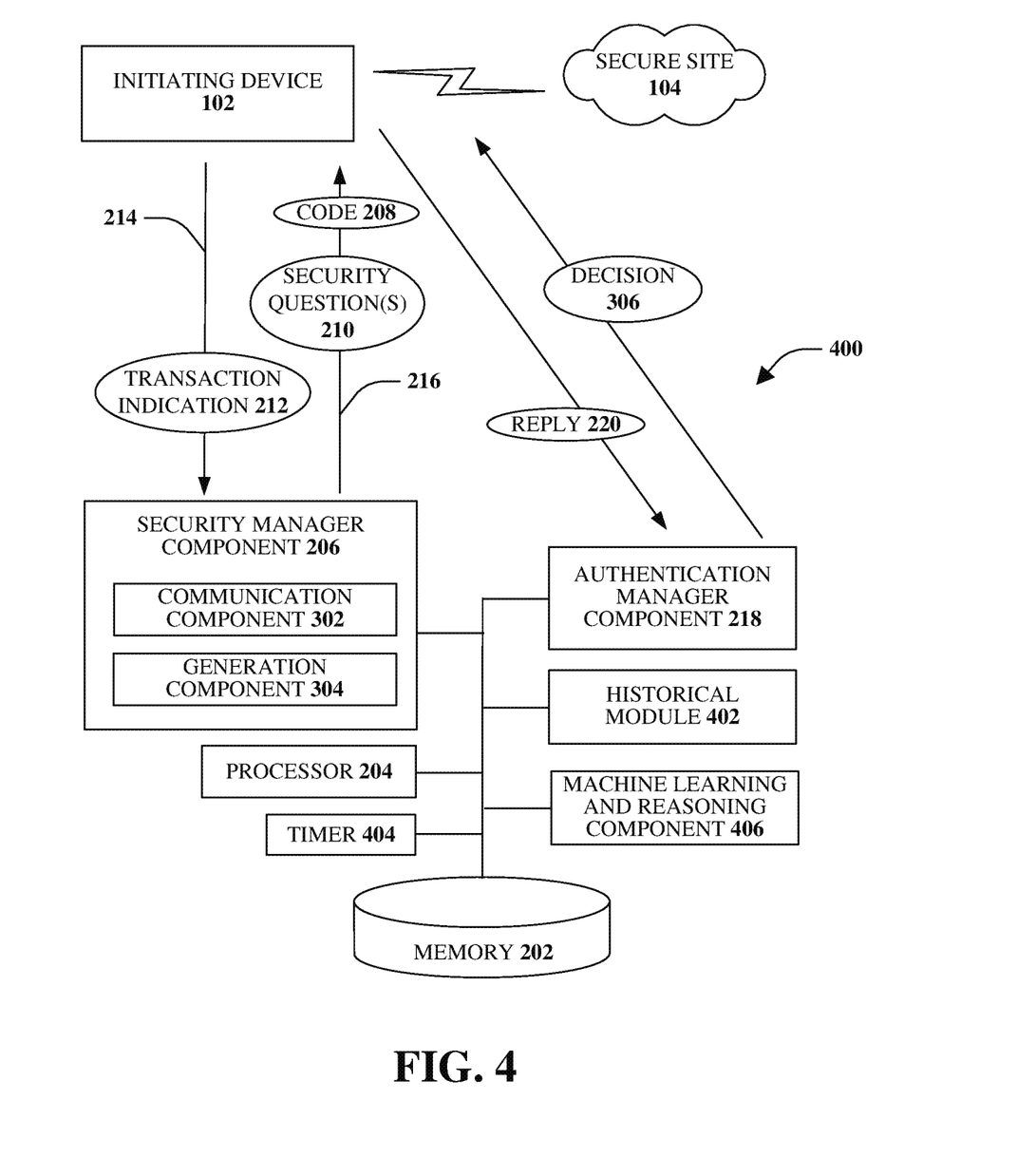
FIG. 4 illustrates another example, non-limiting system configured for dynamic contextual and time sensitive out of band transactional signing, according to an aspect.

FIG. 4 illustrates another example, non-limiting system 400 configured for dynamic contextual and time sensitive out of band transactional signing, according to an aspect. At about the same time as a transaction indication 212 is received from an initiating device 102, over a first communications channel 214, a generation component 304 may be configured to create a token code 208. Further, the communication component 302 may be configured to transmit one or more security questions to the initiating device 102. The token code 208 and the one or more security questions 210 may be transmitted to the initiating device 102 over a second communications channel 216, different from the first communications channel 214. According to some implementations, the one or more security questions 210 are provided in the form of a choice or range of options that may be selected by the user.

For example, the questions may related to the context of the transaction. Thus, the context of a transaction may be appended to the token code (by the initiating device 102) and this combination is a one-time value code. The information included in the reply 220 is processed by the authentication manager component 218. According to an implementation, a historical module 402 may be configured to gather historical details related to the initiating device 102 (and the user of the initiating device 102). For example, details related to transactions performed by the initiating device 102 may be captured over a period of time and the transaction details may be retained in a database associated with the historical module 402. When the reply 220 is received, information included in the reply 220 may be compared, by the authentication manager component 218, to the known historical information. If the information matches, it may indicate that the user of the initiating device 102 may be verified to perform the current transaction.

To match the reply 220 with the historical information, the authentication manager component 218 may make a determination whether the user normally performs the type of transaction being attempted. The details related to the current transaction may be extracted in real time and can be combined to issue a challenge and subsequently verify the user.

In an implementation, the initiating device 102 may add the details without input from the user. For example, the system 400 may know whether the device is a known good device (e.g., a verified device) or whether the authenticity of the device is unverified. Thus, the context may be added to the token code 208, wherein the token code 208 was provided to the initiating device 102 over a channel 216 that is different than the channel 214 used to convey the transaction request 212 from the initiating device 102.

According to some implementations, the context may be extracted based on a downloadable application that is executed on the initiating device 102. The application may have a two-way communication path. Further, the application may initiated an arbitrator state to provide the secure site 104 and/or the security manager component 206 information about a state of the initiating device 102 without requiring intervention from the user of the initiating device 102. For example, the application may be configured to determine a geographic location of the initiating device 102, or may interact with another component, such as a global positioning system or another location means installed on (or associated with) the initiating device 102. Further, the application (or another system component) may determine the internet protocol address that is used by the initiating device 102 and the authentication manager component 218 may determine if the current internet protocol address matches a historical internet protocol address used by the initiating device 102.

In an example, both the internet protocol details and the location coordinates are utilized by the authentication manager component 218 to verify the user (e.g., the initiating device 102). For example, it may be possible for a rogue device to use fake internet protocol addresses or proxies to mask the application details. Thus, by combining both details, it is possible to obtain a greater degree of confidence that the request is originating from the appropriate device.

In accordance with some implementations, at about the same time as the token code 208 and the one or more security questions 210 are transmitted, a timer 404 may be activated. The timer 404 may be configured to determine an amount of time that elapses from transmission of the token code 208 and the one or more security questions 210 to receipt of a reply 220 at the authentication manager component 218.

According to an aspect, information related to a user's login attempt may be considered when determining what level of user input should be received for out of band verification. Such information may include a geographical location (geolocation) of the user, internet behavior, device risk, and so on. If, based on an analysis of the information, it is determined that the user should provide a higher level of verification, the user is provided an OTP or other verification code on a channel that is different from the channel from which the user is attempting to log in. For example, if the user is logging in through a desktop computer, the user may be provided with the OTP though a Short Message Service (SMS) message. The user may then provide the OTP/verification code in conjunction with a user-specific signature that is used by the security of the website to verify that the user is providing the authentication information.

The signature may be generated by the user (e.g., the user device) and may be specific to the context in which the user is required to provide the signature. For example, if the user is attempting to log in from an unknown device at the user's home, the user may be asked to provide a voiceprint or iris scan. On the other hand, if the user is attempting to access the website from an open network in a noisy public location (e.g., a stadium), other sources of user signatures may be required. These other sources may include a fingerprint scan, entering information only the user would know (e.g., mother's maiden name). The OTP and signature combination required for authentication may be time and context sensitive. Thus, if a user takes too long or moves to a different location, for example, the requested OTP/signature combination may no longer be valid.

According to some implementations, automated learning may be employed to facilitate one or more of the disclosed aspects. For example, a machine learning and reasoning component 406 may be utilized to automate one or more of the disclosed aspects. The machine learning and reasoning component 406 may employ automated learning and reasoning procedures (e.g., the use of explicitly and/or implicitly trained statistical classifiers) in connection with determining whether a user device may be authenticated for a specific transaction in accordance with one or more aspects described herein.

For example, the machine learning and reasoning component 406 may employ principles of probabilistic and decision theoretic inference. Additionally or alternatively, the machine learning and reasoning component 406 may rely on predictive models constructed using machine learning and/or automated learning procedures. Logic-centric inference may also be employed separately or in conjunction with probabilistic methods.

The machine learning and reasoning component 406 may infer a potential for fraudulent activity or potential fraud, for example, by obtaining knowledge about various logged information, such as historical data (maintained by a historical module 402), which may include error logs and/or the level of errors. For example, if the trend for fraud is higher for a particular transaction type, the machine learning and reasoning component 406 may automatically require the user to take additional action to complete the authentication, which may also be reflected in a rule-based pattern. In another example, based on a confidence level that user is in fact the authorized user, the machine learning and reasoning component 406 may automatically authenticate the user and continue to authenticate the user during the entire transaction (or at least a portion of the transaction).

As used herein, the term "inference" refers generally to the process of reasoning about or inferring states of the system, a component, a module, the environment, external devices, mobile devices, and so on from a set of observations as captured through events, reports, data, and/or through other forms of communication. Inference may be employed to identify a specific context or action, or may generate a probability distribution over states, for example. The inference may be probabilistic. For example, computation of a probability distribution over states of interest based on a consideration of data and/or events. The inference may also refer to techniques employed for composing higher-level events from a set of events and/or data. Such inference may result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) may be employed in connection with performing automatic and/or inferred action in connection with the disclosed aspects.

If the machine learning and reasoning component 406 has uncertainty related to the authentication of the user, the machine learning and reasoning component 406 may automatically engage in a short (or long) dialogue or interaction with the user (e.g., answer a security question, enter a temporary code, and so on). In accordance with some aspects, the machine learning and reasoning component 406 engages in the dialogue with the user through another system component and/or an external device.

The various aspects (e.g., in connection with authentication of a user at initiation of a transaction and at various times during the transaction, and so forth) may employ various artificial intelligence-based schemes for carrying out various aspects thereof. For example, a process for determining if particular biological or health factors of a user match an expected value or range of values, or have an unexpected value may be enabled through an automatic classifier system and process.

A classifier is a function that maps an input attribute vector, $x=(x1, x2, x3, x4, xn)$, to a confidence that the input belongs to a class. In other words, $f(x)=\text{confidence(class)}$. Such classification may employ a probabilistic and/or statistical-based analysis (e.g., factoring into the analysis utilities and costs) to prognose or infer an action that should be employed to determine the identity of a user.

A support vector machine (SVM) is an example of a classifier that may be employed. The SVM operates by finding a hypersurface in the space of possible inputs, which hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein, may be inclusive of statistical regression that is utilized to develop models of priority.

One or more aspects may employ classifiers that are explicitly trained (e.g., through a generic training data) as well as classifiers that are implicitly trained (e.g., by observing historical patterns related to health, geolocation, devices, and so on). For example, SVM's may be configured through a learning or training phase within a classifier constructor and feature selection module. Thus, a classifier(s) may be used to automatically learn and perform a number of functions, including but not limited to determining according to a predetermined criteria when to automatically authenticate a user (e.g., the initiating device 102), which transaction types should have an additional authentication procedure, which transaction amounts should have an additional authentication procedure, and so on.

Additionally or alternatively, an implementation scheme (e.g., a rule, a policy, and so on) may be applied to control and/or regulate when and how a user is authenticated. In some implementations, based upon a predefined criterion, the rules-based implementation may automatically and/or dynamically implement one or more rules and/or confidence levels associated with a particular authentication procedure. In response thereto, the rule-based implementation may automatically interpret and carry out functions associated with the authentication procedure by employing a predefined and/or programmed rule(s) based upon any desired criteria.

Methods that may be implemented in accordance with the disclosed subject matter will be better appreciated with reference to the flow charts. While, for purposes of simplicity of explanation, the methods are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the disclosed methods. It is to be appreciated that the functionality associated with the blocks may be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 5:
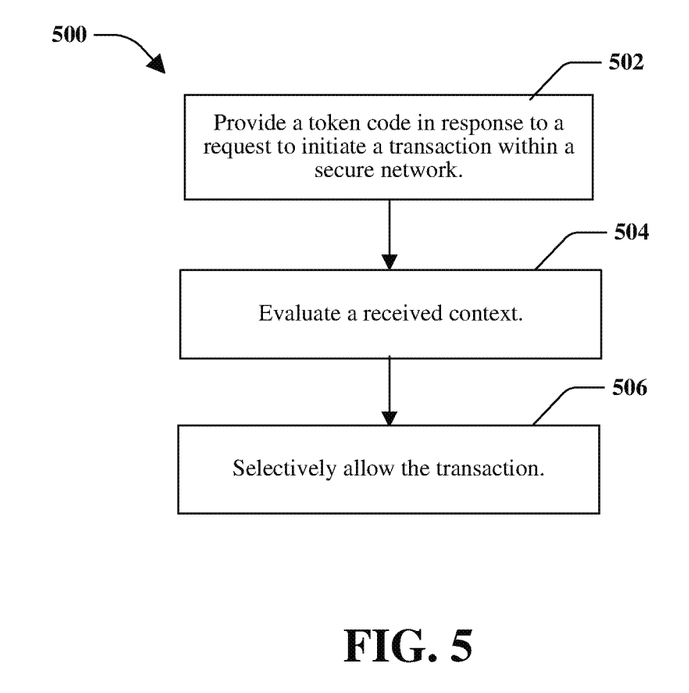
FIG. 5 illustrates an example, non-limiting method for out of band authorization, according to an aspect.

FIG. 5 illustrates an example, non-limiting method 500 for out of band authorization, according to an aspect. The method 500 in FIG. 5 may be implemented using, for example, any of the systems, such as the system 100 (of FIG. 1). Computing devices encounter multiple risks, including malware. When an OTP or passcode is provided in response to an attempt to access a secure network, according to traditional methods, the OTP or passcode may need to be entered into an application installed on the computing device (or on another computing device). If there is malware, for example, resident on the computing device, the OTP or passcode is rendered useless because the malware can intercept the code. Thus, the computing device is still open to risk, such as a man in the middle attack.

Thus, method 500 may be configured to allow the computing device to add a context to the OTP or passcode and submit both at substantially the same time. In some implementations, the OTP or passcode can be relayed to the computing device on a channel that is distinct from another channel that was used to initiate the access request.

Method 500 starts, at 502, when a token code is provided in response to a request to initiate a transaction within a secure network (such as secure site 104 of FIG. 1). The request may be received, from a user device (such as initiating device 102 of FIG. 1) over a first channel and the token code is provided over a second channel. The first channel and the second channel are different channels. Further, the request may include an indication of an attempt to initiate a transaction with the secure network. The indication may be a request to access a portion of the secure network or to perform another function (e.g., a transaction) within the secure network.

According to an implementation, the request to initiate the transaction may be received after an identity of a user authorized to access to access a secure network is received and verified. For example, the identity of the user may be verified based on a received user name/password pair or another means of identification or credentials (e.g., biometric identification).

At 504, a received context is evaluated. The received context may be appended to the token code. Further, the received context may be in reply to the token and may be received from a device that originally initiated the transaction (e.g., the initiating device). However, according to some implementations, the context may be received from a rogue device attempting to commit fraud (and such attempts may be denied, as discussed herein). According to some implementations, the evaluation of the received context may be in reply to one or more challenges or questions, which may be determined based on whether the attempted transaction is a non-monetary transaction or a monetary transaction.

The method 500 continues, at 506, when the transaction is selectively allowed based on the context appended to the code. Selective approval of the transaction may include allowing the transaction, denying the transaction, or requesting additional information and performing another determination as to whether the transaction should be allowed or denied.

For example, the transaction may be approved based on a determination that the context matches at least one parameter of the transaction. In another example, the transaction may be denied based on a determination that the context does not match at least one parameter of the transaction.

Figure 6:
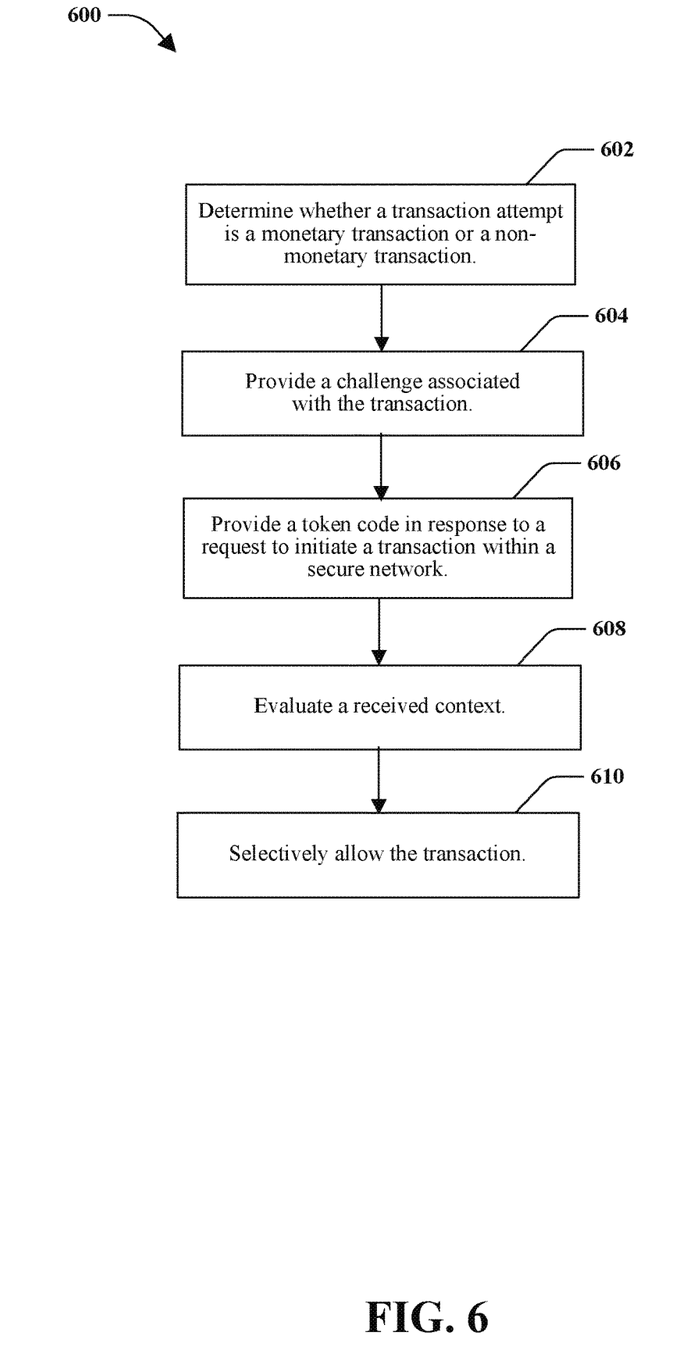
FIG. 6 illustrates an example, non-limiting method configured to perform contextual out of band authentication with a secure site, according to an aspect.

FIG. 6 illustrates an example, non-limiting method 600 configured to perform contextual out of band authentication for transactions, according to an aspect. The method 600 in FIG. 6 may be implemented using, for example, any of the systems, such as the system 200 (of FIG. 2).

At 602, a determination is made whether an attempted transaction is a monetary transaction or a non-monetary transaction. A monetary transaction relates to the viewing, transferring, depositing, withdrawing, or conducting other actions with respect to finances (e.g., bank accounts, loan accounts, credit cards, securities, bonds, stocks, insurance, and so forth). A non-monetary transaction relates to actions that do not directly involve finances, such as changes to a mailing address, a phone number, an email alias, or other actions.

At 604, a challenge associated with the transaction is provided. According to an implementation, the challenge may comprise a range of options, wherein at least one option of the range of options comprises a context. For example, if the transaction is a non-monetary transaction, the challenge may relate to information associated with a context of the user (e.g., an answer to a security question, location information, and so on). If the transaction is a monetary transaction, the challenge may related to details about the transaction and/or details associated with the context of the user.

A token code is provided, at 606. The token code may be provided at substantially the same time as the challenge is provided. Further, the token code and challenged may be provided over a communications channel that is different from a communications channel over which the indication of the attempted transaction is received.

A context (e.g., a response to the challenge) is received and evaluated, at 608. The context may be appended to the token code. In an implementation, evaluating the received context includes comparing the received context to at least one parameter associated with the transaction. According to another implementation, if the token code is not the token code (or an encrypted version thereof) that was sent, at 606, the transaction attempt is denied, at 610. If the token code matches, the evaluation may include determining if the context matches an expected response. In some implementations, the context may be compared to historical information related to the user and/or user device. If the token code and the context are as expected, the attempted transaction is allowed to continue, at 610.

Figure 7:
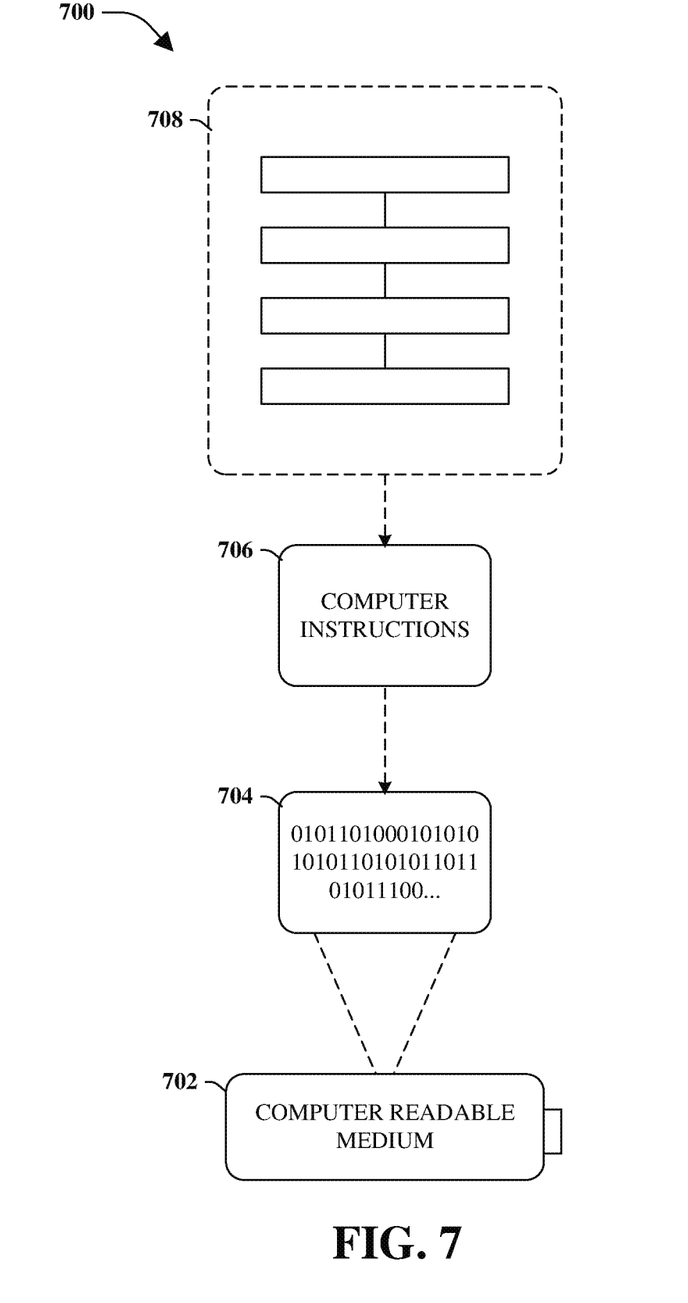
FIG. 7 illustrates an example, non-limiting computer-readable medium or computer-readable device including processor-executable instructions configured to embody one or more of the aspects set forth herein.

One or more implementations include a computer-readable medium including processor-executable instructions configured to implement one or more embodiments presented herein. An embodiment of a computer-readable medium or a computer-readable device devised in these ways is illustrated in FIG. 7, wherein an implementation 700 includes a computer-readable medium 702, such as a CD-R, DVD-R, flash drive, a platter of a hard disk drive, and so forth, on which is encoded computer-readable data 704. The computer-readable data 704, such as binary data including a plurality of zero's and one's as illustrated, in turn includes a set of computer instructions 706 configured to operate according to one or more of the principles set forth herein.

In the illustrated embodiment 700, the processor-executable computer instructions 706 may be configured to perform a method 708, such as the method 500 of FIG. 5 and/or the method 600 of FIG. 6, for example. In another embodiment, the processor-executable instructions 704 may be configured to implement a system, such as the system 200 of FIG. 2 and/or the system 300 of FIG. 3, for example. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
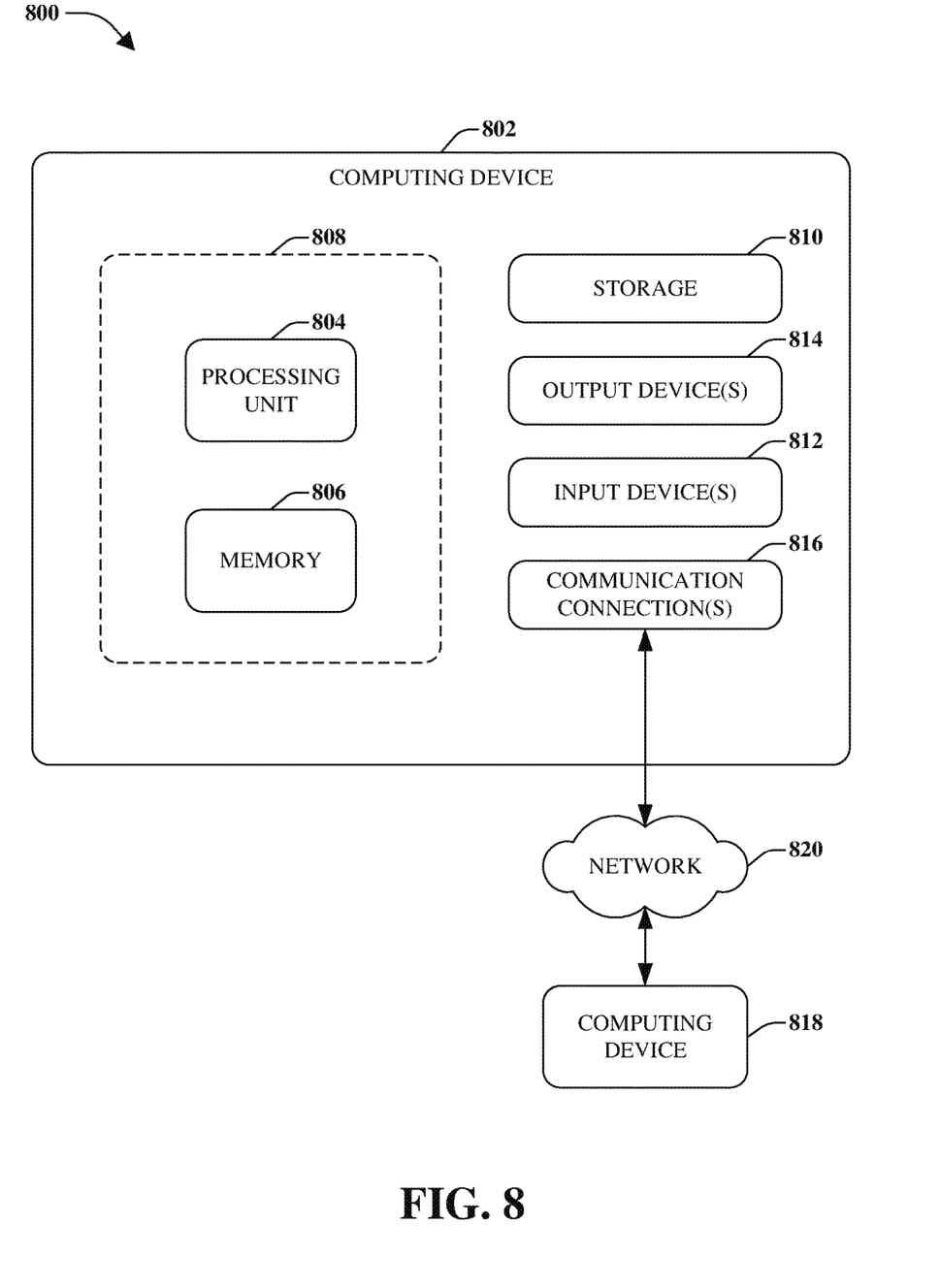
FIG. 8 illustrates an example, non-limiting computing environment where one or more of the aspects set forth herein are implemented, according to one or more embodiments.

FIG. 8 and the following discussion provide a description of a suitable computing environment to implement embodiments of one or more of the aspects set forth herein. The operating environment of FIG. 8 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 8 illustrates a system 800 that may include a computing device 802 configured to implement one or more embodiments provided herein. In one configuration, the computing device 802 may include at least one processing unit 804 and at least one memory 806. Depending on the exact configuration and type of computing device, the at least one memory 806 may be volatile, such as RAM, nonvolatile, such as ROM, flash memory, etc., or a combination thereof. This configuration is illustrated in FIG. 8 by dashed line 808.

In other embodiments, the device 802 may include additional features or functionality. For example, the device 802 may include additional storage such as removable storage or non-removable storage, including, but not limited to, magnetic storage, optical storage, etc. Such additional storage is illustrated in FIG. 8 by storage 810. In one or more embodiments, computer readable instructions to implement one or more embodiments provided herein are in the storage 810. The storage 810 may store other computer readable instructions to implement an operating system, an application program, etc. Computer readable instructions may be loaded in the at least one memory 806 for execution by the at least one processing unit 804, for example.

Computing devices may include a variety of media, which may include computer-readable storage media or communications media, which two terms are used herein differently from one another as indicated below.

Computer-readable storage media may be any available storage media, which may be accessed by the computer and includes both volatile and nonvolatile media, removable and non-removable media. By way of example, and not limitation, computer-readable storage media may be implemented in connection with any method or technology for storage of information such as computer-readable instructions, program modules, structured data, or unstructured data. Computer-readable storage media may include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which may be used to store desired information. Computer-readable storage media may be accessed by one or more local or remote computing devices (e.g., via access requests, queries or other data retrieval protocols) for a variety of operations with respect to the information stored by the medium.

Communications media typically embody computer-readable instructions, data structures, program modules, or other structured or unstructured data in a data signal such as a modulated data signal (e.g., a carrier wave or other transport mechanism) and includes any information delivery or transport media. The term "modulated data signal" (or signals) refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The device 802 may include input device(s) 812 such as keyboard, mouse, pen, voice input device, touch input device, infrared cameras, video input devices, or any other input device. Output device(s) 814 such as one or more displays, speakers, printers, or any other output device may be included with the device 802. The input device(s) 812 and the output device(s) 814 may be connected to the device 802 via a wired connection, wireless connection, or any combination thereof. In one or more embodiments, an input device or an output device from another computing device may be used as the input device(s) 812 and/or the output device(s) 814 for the device 802. Further, the device 802 may include communication connection(s) 816 to facilitate communications with one or more other devices, illustrated as a computing device 818 coupled over a network 820.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, an ordering, etc. Rather, such terms are merely used as identifiers, names, etc. for features, elements, items, etc.

For example, a first channel and a second channel generally correspond to channel A and channel B or two different or two identical channels or the same channel. Additionally, "comprising," "comprises," "including," "includes," or the like generally means comprising or including.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system, comprising:
    a processor that executes the following computer executable components stored in a memory:
    a machine learning and reasoning component that employs automated learning and reasoning procedures in connection with determining a level of actions to complete an authentication;
    a security manager component that transmits the determined level of actions in response to an indication of a transaction attempt, wherein the indication is received over a first communications channel and at least one of the actions of the level of actions are transmitted over a second communications channel different from the first communications channel, wherein the different communication channels are channels between a same communication pair; and
    an authorization manager component that analyzes a reply to the determined level of actions and selectively allows the transaction based on the analysis, wherein the analysis makes use of the machine learning and reasoning component in connection with determining whether a user device may be authenticated for the transaction attempt.

2. The system of claim 1, wherein the authentication is for out of band verification.

3. The system of claim 1, wherein the same communication pair comprises a user and an authorization entity.

4. The system of claim 1, wherein the level of actions to complete an authentication is based at least in part on a trend result of a type of the transaction as inferred for potential fraud by the machine learning and reasoning component.

5. The system of claim 1, wherein the level of actions to complete an authentication comprises at least a use of a token code and a context.

6. The system of claim 5, wherein the authentication is based at least in part on a determination that a received token code matches an expected token code and the context is a reply that matches an expected reply.

7. The system of claim 5, wherein the authorization manager component requests additional information based on a determination that the reply does not match an expected reply.

8. The system of claim 5, wherein the context comprises details related to the transaction attempt.

9. The system of claim 5, wherein the context comprises a state of an initiating device without requiring intervention from the user of the initiating device and wherein a format of the context is automatically applied at an initiating device.

10. The system of claim 5, wherein the context comprises an internet protocol address and a location coordinate of an initiating device.

11. The system of claim 5, wherein the determined level further comprises a timer that is activated at about the same time as the determined level of actions are transmitted and the transaction is automatically denied if the reply is not received before expiration of the timer.

12. The system of claim 5, wherein the determined level further comprises a timer that is activated at about the same time as the determined level of actions are transmitted and the transaction is selectively allowed if the reply is received before expiration of the timer.

13. The system of claim 1, wherein the authorization manager component implements a change at an initiating device based on a determination that the transaction is approved.

14. The system of claim 13, wherein the change is a graphical user interface update.

15. A method, comprising:
    determining, by a system comprising a processor, a level of actions to complete an authentication in response to a request to initiate a transaction, wherein the request is received over a first communication channel and at least one action of the level of actions is provided over a second communication channel, wherein the first communication channel and the second communication channel are different communication channels, and wherein the different communication channels are channels between a same communication pair;
    receiving, by the system, a reply to the determined level of actions;
    analyzing, by the system, the received reply;
    selectively allowing, by the system, the transaction based on at least the analyzed reply,
        wherein the transaction is selectively allowed based, at least in part, on automated learning and reasoning procedures employed in connection with the determining and analyzing.

16. The method of claim 15, wherein the same communication pair comprises a user and an authorization entity.

17. The method of claim 15, wherein the level of actions to complete an authentication is based at least in part on a trend result of a type of the transaction as inferred for potential fraud by the machine learning and reasoning component.

18. A non-transitory computer-readable storage device storing executable instructions that, in response to execution, cause a system comprising a processor to perform operations, comprising:
    determining, by a machine learning and reasoning component, a level of actions to complete an authentication in response to a request to initiate a transaction, wherein the request is received over a first communication channel and at least one action of the level of actions is provided over a second communication channel, wherein the first communication channel and the second communication channel are different communication channels, and wherein the different communication channels are channels between a same communication pair;
    receiving, by a security manager component, a reply to the determined level of actions;
    analyzing, by an authorization manager component, the received reply;
    selectively allowing, by the authorization manager component, the transaction based on at least the analyzed reply, wherein the transaction is selectively allowed based, at least in part, on automated learning and reasoning procedures employed in connection with the determining and analyzing.

19. The non-transitory computer-readable storage device of claim 18, wherein the same communication pair comprises a user and an authorization entity.

20. The non-transitory computer-readable storage device of claim 18, wherein the level of actions to complete an authentication is based at least in part on a trend result of a type of the transaction as inferred for potential fraud by the machine learning and reasoning component.

* * * * *